United States Patent [19]

Rhyne et al.

[11] Patent Number: 5,576,726

[45] Date of Patent: Nov. 19, 1996

[54] ELECTRO-LUMINESCENT DISPLAY DEVICE DRIVEN BY TWO OPPOSITE PHASE ALTERNATING VOLTAGES AND METHOD THEREFOR

[75] Inventors: George W. Rhyne, Scottsdale; Curtis D. Moyer, Phoenix, both of Ariz.

[73] Assignee: Motorola, Schaumburg, Ill.

[21] Appl. No.: 342,968

[22] Filed: Nov. 21, 1994

[51] Int. Cl.$^6$ ................................................ G09G 3/30
[52] U.S. Cl. ............................................. 345/76; 345/79
[58] Field of Search ........................... 345/76, 79, 80, 345/77, 78, 45; 315/169.1, 169.3; 340/825.81, 825.82; 257/296, 369, 379; 313/463, 461; 327/281, 284, 280

[56] References Cited

U.S. PATENT DOCUMENTS

| | | | |
|---|---|---|---|
| 4,523,189 | 6/1985 | Takahara et al. | 345/80 |
| 4,845,489 | 7/1989 | Hormel | 345/76 |
| 5,006,838 | 4/1991 | Fujioka et al. | 345/79 |
| 5,066,893 | 11/1991 | Osada et al. | 345/45 |
| 5,095,304 | 3/1992 | Young | 345/92 |
| 5,280,278 | 1/1994 | Vick | 345/76 |
| 5,302,966 | 4/1994 | Stewart | 345/76 |

*Primary Examiner*—Richard Hjerpe
*Assistant Examiner*—Chanh Nguyen
*Attorney, Agent, or Firm*—Robert F. Hightower

[57] ABSTRACT

An electro-luminescent display (10) utilizes a complementary field effect transistor driver (14) to control an electro-luminescent display element or pixel element (11). Two alternating voltages (23, 24) are utilized to stimulate light emission from the pixel (11). Each voltage (23, 24) is no greater than a threshold voltage of the pixel so that both voltages (23, 24) are required to stimulate light emission. The driver (14) couples a first voltage (24) to one electrode (13) of the pixel while the second voltage (23) is coupled to the other electrode (12) of the pixel.

10 Claims, 2 Drawing Sheets

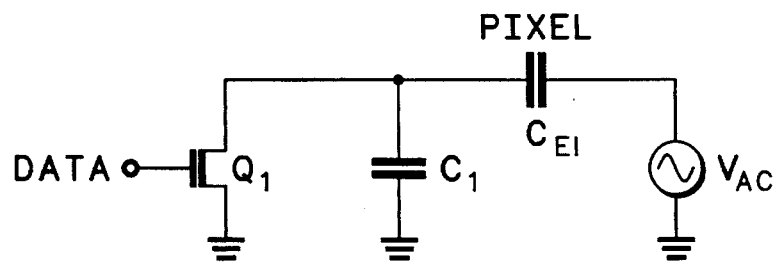
FIG. 1  — PRIOR ART —
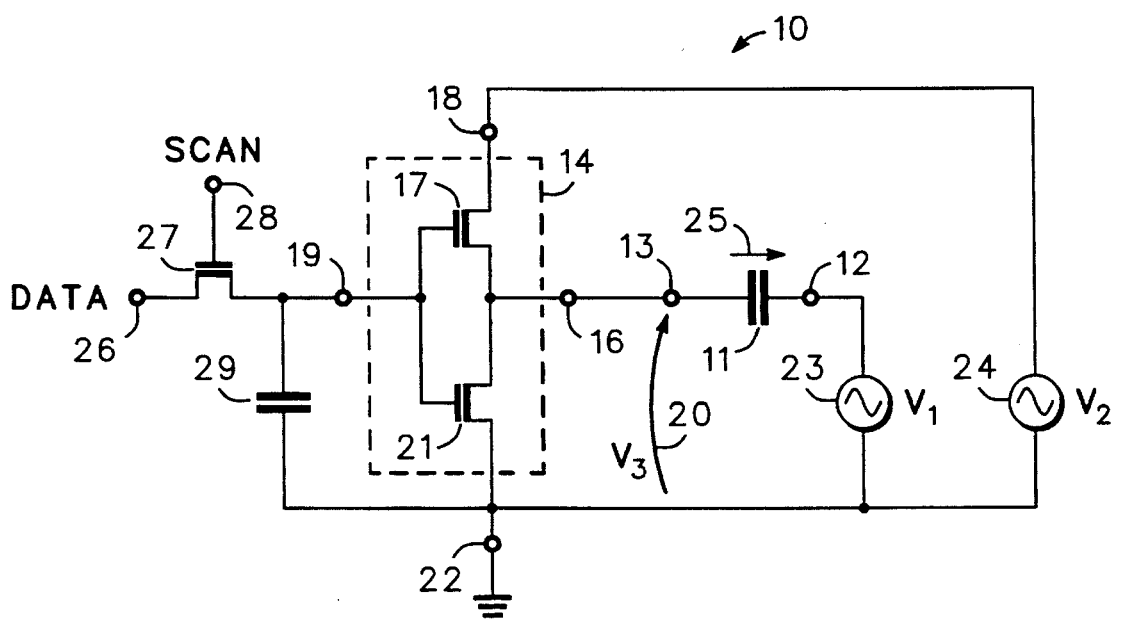
FIG. 2

10 # ELECTRO-LUMINESCENT DISPLAY DEVICE DRIVEN BY TWO OPPOSITE PHASE ALTERNATING VOLTAGES AND METHOD THEREFOR

BACKGROUND OF THE INVENTION

The present invention relates, in general, to display devices, and more particularly, to electro-luminescent displays and circuits.

Electro-luminescent displays are well known in the art and are used for a variety of display applications. FIG. 1 schematically illustrates a prior art circuit utilized for controlling thin film electro-luminescent displays. Such thin film electro-luminescent displays utilize a voltage divide capacitor ($C_1$) and an open drain transistor ($Q_1$) to control each pixel element of the display. An individual pixel of the electro-luminescent display functions as a capacitor $C_{el}$. As illustrated by the connection of $V_{ac}$ to capacitor $C_{el}$, an alternating voltage ($V_{ac}$) is applied to one electrode of the pixel. Voltage $V_{ac}$ has a value that is greater than a threshold voltage of the pixel in order to ensure that the pixel emits light. As used herein, "threshold voltage" of the pixel means a voltage at which light generation is observed by an unaided human eye, and is also the voltage at which the onset of cyclic avalanche breakdown occurs within the pixel. Display information is provided as a DATA signal that is applied to $Q_1$. When the DATA signal applied to $Q_1$ is low, $Q_1$ is disabled so that voltage $V_{ac}$ is divided between capacitors $C_1$ and $C_{el}$ and no light is emitted by the pixel. When the DATA signal enables $Q_1$, capacitor $C_1$ is shorted and all of voltage $V_{ac}$ is across $C_{el}$ so that the pixel emits light.

One problem with the prior art circuits is that divider capacitor $C_1$ is very large thereby limiting the number of pixels on the display. The combined area of $Q_1$ and $C_1$ is usually larger than the size of the pixel. Such a large size results in high display costs. Additionally, divider capacitors generally are built using thin silicon dioxide layers that result in low yields thereby further increasing display costs.

Accordingly, it is desirable to have an electro-luminescent display having a control circuit that occupies an area smaller than the pixel area, and that does not require a divider capacitor.

BRIEF DESCRIPTION OF THE DRAWINGS

FIG. 1 illustrates a prior art circuit used for electro-luminescent displays;

FIG. 2 schematically illustrates an electro-luminescent display circuit in accordance with the present invention;

DETAILED DESCRIPTION OF THE DRAWINGS

Figure 3:
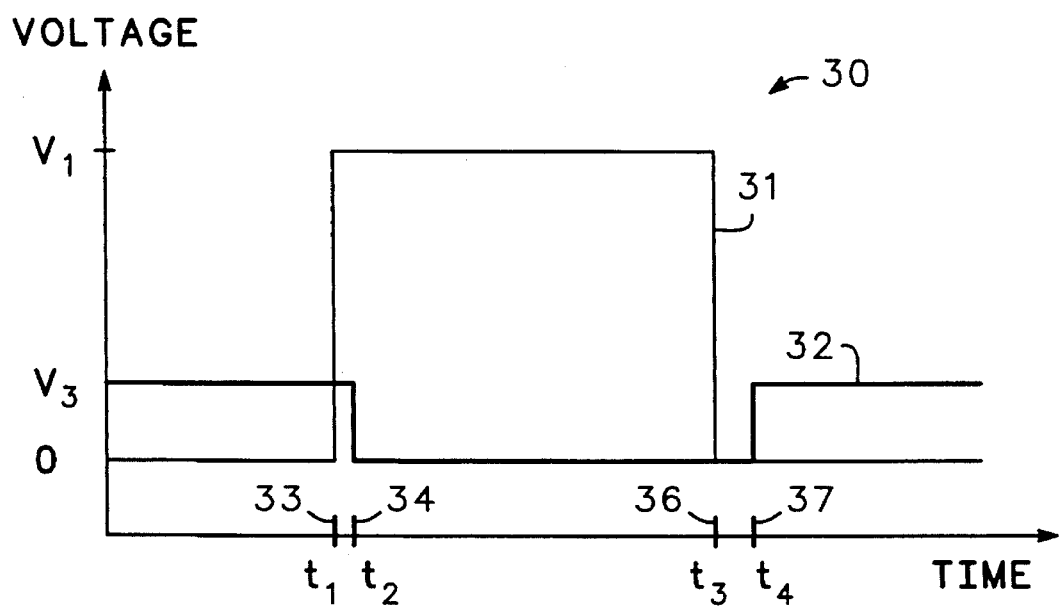
FIG. 3 is a graph illustrating voltages within the circuit of FIG. 2 in accordance with the present invention.

FIG. 2 schematically illustrates a portion of an electro-luminescent display 10 that utilizes a low breakdown voltage small area driver for controlling display 10. A pixel element 11 of display 10 is schematically illustrated as a capacitor having a first electrode 12 and a second electrode 13. A first alternating voltage 23 ($V_1$) has a positive voltage or positive output that is connected to electrode 12, and a negative output that is connected to a ground reference 22. Electrode 13 is connected to an output 16 of a complementary field effect transistor driver 14, illustrated by a dashed box, that actively drives electrode 13. Driver 14 has a voltage supply terminal 18 that is connected to a positive voltage or positive output of a second alternating voltage 24 ($V_2$). A voltage return terminal of driver 14 is connected to reference 22. In order to actively drive electrode 13 between voltage 24 and reference 22, driver 14 utilizes a first field effect transistor or P-channel transistor 17 that is connected in a stacked configuration with a second field effect transistor or N-channel transistor 21. Transistor 17 has a first current electrode or source connected to terminal 18, a second current electrode or drain connected to output 16, and a control electrode or gate connected to an input 19 of driver 14. Transistor 21 has a first current electrode or source connected to reference 22, a second current electrode or drain connected to output 16, and a control electrode or gate connected to input 19. The voltage applied to electrode 13 by driver 14 is a voltage 20 ($V_3$), represented by an arrow. When transistor 17 is on, voltage 20 is voltage 24 minus any voltage drop across transistor 17, which typically results in voltage 20 being essentially voltage 24. When transistor 17 is off and transistor 21 is on, voltage 20 is essentially zero or ground.

A voltage 25, illustrated by an arrow, represents the voltage across pixel element 11, that is, the voltage on electrode 12 measured relative to electrode 13. The value of voltage 25 is voltage 23 minus voltage 20. As will be seen hereinafter, voltage 23 and 24 are substantially out of phase, thus voltage 20 has an opposite sign relative voltage 23 so that the magnitude of voltage 25 is voltage 23 plus the magnitude of voltage 20 [$V_1-(-V_3)=V_1+V_3$]. In order for voltage 25 to stimulate light emission from element 11, the maximum absolute value of voltage 23 plus the maximum absolute value of voltage 20 should be at least a value greater than the threshold voltage of pixel element 11. Also, the maximum absolute value of voltage 23 plus the maximum absolute value of voltage 20 should be no greater than the maximum intensity voltage of pixel element 11, that is, the voltage value that provides a maximum light output from pixel element 11. The individual value of each of voltages 23 and 20 can be any combination of values that meet such criteria as long as voltage 23 and voltage 20 individually are less than the threshold voltage of pixel element 11. This ensures that neither voltage 23 nor voltage 20 individually can cause light emission from pixel element 11. Furthermore, in order to prevent damaging driver 14, the value of voltage 20 must be less than the breakdown voltage of driver 14. Generally, voltage 23 is chosen to have a value that is just less than the threshold voltage, and voltage 20 is chosen to have a value that is no greater than the difference between the value of voltage 23 and the maximum intensity voltage. Consequently, when driver 14 is enabled, voltage 20 (voltage 24 minus the voltage dropped across transistor 17) is applied to electrode 13, and the resulting voltage 25 is voltage 23 minus the out of phase voltage 20. Thus, voltages 23 and 20 add to create a voltage 25 in excess of the threshold voltage of pixel element 11, as will be seen hereinafter. When driver 14 is disabled, electrode 13 is connected through transistor 21 to reference 22, and voltage 23 is applied to pixel element 11. Since voltage 23 is less than the threshold voltage of pixel element 11, no light is emitted.

In the preferred embodiment, pixel element 11 has a threshold voltage of approximately one hundred twenty to one hundred sixty volts, and a maximum voltage of approximately one hundred sixty to two hundred volts. Voltage 23 is chosen to have a value of approximately one hundred twenty volts, and voltage 24 is chosen to have a value of approximately forty volts. Consequently, the breakdown voltage of driver 14 only has to be at least approximately forty volts.

Because two different voltages are used to drive pixel element 11, the capacitive voltage divider of prior art circuits is not required, thus, a space saving over prior art circuits is realized. Also, yields are higher because the yield lowering thin oxide of the divider capacitor is no longer required.

Information to be displayed by pixel element 11 is applied to a data line 26 (DATA) of display 10. A select transistor 27 applies the information on line 26 to input 19 and to a storage capacitor 29 when a scan signal input 28 enables transistor 27. Consequently, transistor 27 has a drain connected to line 26, a source connected to capacitor 29 and input 19, and a gate connected to scan input 28. While transistor 27 is enabled, capacitor 29 is charged to store the information on line 26. The information remains stored on capacitor 29 after transistor 27 is disabled so that pixel element 11 can continue to display the information.

FIG. 3 is a graph illustrating the operation of voltages 20 and 23 shown in FIG. 2. FIG. 3 is described in the description of FIG. 4.

Figure 4:
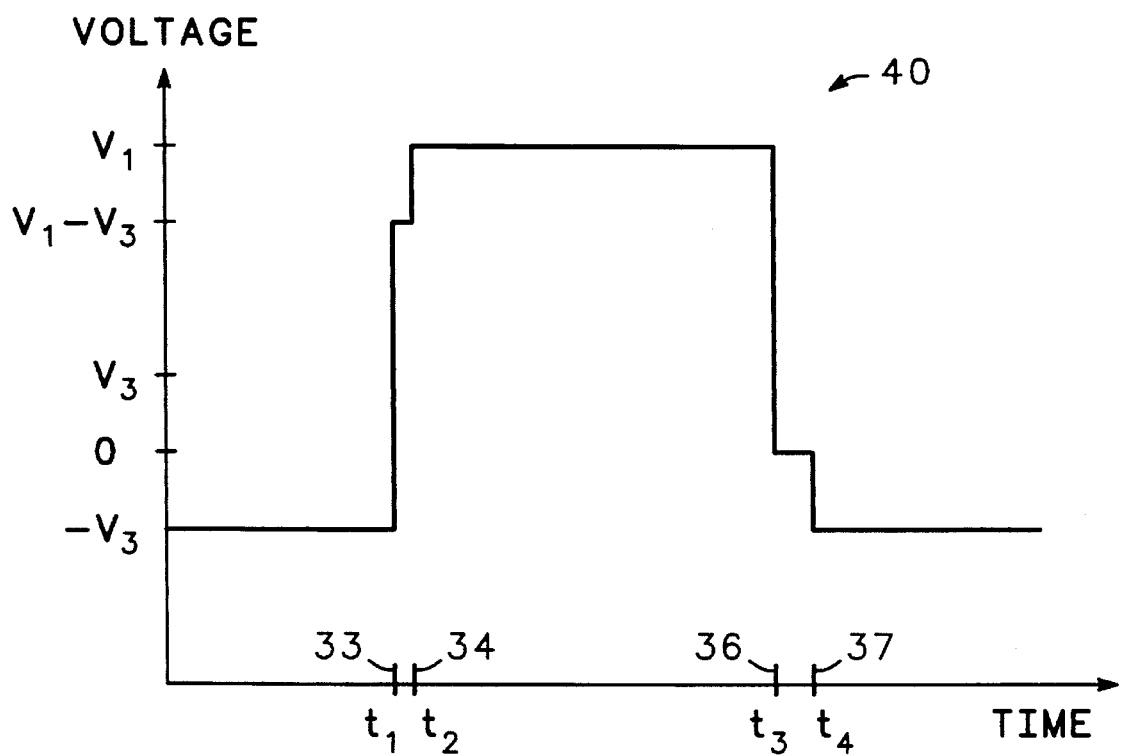
FIG. 4 is a graph illustrating a pixel drive voltage in accordance with the present invention.

FIG. 4 is a graph illustrating the resultant voltage 25 across pixel element 11 in FIG. 2 when transistor 17 is in a conductive or enabled condition. The following description has references to FIG. 2, FIG. 3, and FIG. 4. The ordinate of FIG. 3 and FIG. 4 represents a voltage value and the abscissa represents time. FIG. 3 includes a plot 31 and a plot 32 that represent the value of voltages 23 and 20 respectively, shown in FIG. 2. As indicated by plots 31 and 32, voltages 23 and 20 operate out of phase. Ideally, voltages 23 and 20 have opposite or inverted phases; however, this is difficult to achieve. Consequently, FIG. 3 illustrates plots 31 and 32 having a phase that is not exactly inverted. As illustrated by plot 31, the output of voltage 23 is zero up until a time 33 ($t_1$) when the output value becomes $V_1$. Voltage 23 remains $V_1$ until returning to zero at a time 36 ($t_3$). Plot 32 shows that voltage 20 has a value $V_3$ until a time 34 ($t_2$) when the output of voltage 24 becomes zero thereby causing voltage 20 to become substantially zero. As shown, time 34 is slightly greater than time 33 so that voltages 23 and 20 overlap for a time $t_1$ minus $t_2$. Voltage 20 remains zero until a time 37 ($t_4$) when the output of voltage 24 becomes $V_2$, thus, voltage 20 once again becomes $V_3$. As shown in FIG. 3, both voltages 20 and 23 will have a zero output for a time $t_3$ minus $t_4$.

FIG. 4 illustrates a plot 40 representing voltage 25 across pixel element 11, that is, electrode 13 is a reference point for the plot shown in FIG. 4. Up until time 33 ($t_1$), voltage 23 is zero and voltage 20 is $V_3$ so that voltage 25 is the zero volts applied to electrode 12 minus $V_3$ applied to electrode 13, that is, $-V_3$. At time 33 ($t_1$) voltage 23 applies $V_1$ to electrode 12, and voltage 25 becomes $V_1$ minus $V_3$. At time 34 ($t_2$) voltage 20 turns off so that voltage 25 becomes $V_1$.

Pixel element 11 (FIG. 2) emits light when a voltage change occurs across pixel element 11, for example, between time 33 and time 34 when the voltage across pixel element 11 changes from $-V_3$ to $V_1$. The value of the voltage change is $-V_3$ subtracted from $V_1$. For example, if voltage 23 is one hundred twenty volts and voltage 20 is forty volts, the voltage change across pixel element 11 between time 33 and time 34 is one hundred sixty volts. Voltage 25 remains at $V_1$ until time 36 ($t_3$) when voltage 23 becomes zero, and changes again at time 37 ($t_4$) when voltage 20 is once again active. The voltage change between time 36 and 37 is the same as the voltage change between time 33 and 34.

Because the edges of plots 31 and 32 are not coincident, the full voltage change does not occur in a single step but occurs during a time period $t_1$ minus $t_2$ and at $t_3$ minus $t_4$. If the periods $t_1$ minus $t2$, and $t_3$ minus $t_4$ each are less than the time it takes for internal leakage currents within pixel element 11 to discharge pixel element 11, then pixel element 11 responds as though the entire voltage difference is applied across pixel element 11 at one step. As shown by FIG. 3 and FIG. 4, since voltages 23 and 20 operate out of phase the voltage applied across pixel element 11 (voltage 25) is the sum of the magnitude of both voltages 23 and 20.

Although display 10 is shown with a single element 11 and associated circuitry for simplicity of the explanation, display 10 typically has a plurality of elements 11 formed in an array wherein electrode 12 is formed as a single conductive layer common to all pixel elements. In such a configuration, each pixel element would have a separate individual second electrode, such as electrode 13, and an associated driver, storage capacitor, and select transistor, such as driver 14, capacitor 29, and transistor 27. Display 10 (FIG. 2) can be built by a variety of methods including building all elements of display 10 on a semiconductor substrate. For example display 10 may be built as an electro-luminescent display circuit on a silicon substrate with at least driver 14 and transistor 27 formed in the silicon substrate, and element 11 formed on the surface of the silicon substrate. Also, a glass substrate having a layer of amorphous silicon on the substrate can be utilized for forming display 10.

By now, it should be appreciated that there has been provided a novel electro-luminescent display. By utilizing two opposite phase alternating voltages to enable a pixel element, the large divider capacitor of prior art circuits is eliminated and the size of driver 14 is smaller than prior art drivers. Also the yield is higher because a thin oxide for a divider capacitor is no longer needed. Consequently, pixel density is higher than the pixel density of prior art displays, and the cost of manufacturing the drive circuit and the display is less than the cost of manufacturing prior art drive circuits and displays.

We claim:

1. A method of controlling an electro-luminescent display comprising:

providing a pixel element of the electro-luminescent display, the pixel element having a first electrode and a second electrode;

applying a first alternating voltage to the first electrode;

coupling an output of a complementary field effect transistor driver to the second electrode, which is comprising:

coupling a first current electrode of a P-channel transistor to the second alternating voltage, coupling a second current electrode of the P-channel transistor to the output of the complementary field effect transistor driver, coupling a control electrode of the P-channel transistor to an input of the complementary field effect transistor driver, coupling a first current electrode of an N-channel transistor to a ground reference, coupling a second current electrode of the N-channel transistor to the output of the complementary field effect transistor driver, and coupling a control electrode of the N-channel transistor to the input of the complementary field effect transistor driver; and applying a second alternating voltage to a current electrode of the complementary field effect transistor driver.

2. The method of claim 1 wherein coupling the output of the complementary field effect transistor driver to the second electrode includes coupling a P-channel transistor and an N-channel transistor in a stacked configuration between a ground reference and the second alternating voltage.

3. The method of claim 1 wherein applying the first alternating voltage to the first electrode includes applying a voltage that alternates between zero volts and a first positive voltage, and has a phase that is substantially opposite to a phase of the second alternating voltage.

4. The method of claim 3 wherein applying the second alternating voltage includes applying a voltage that alternates between zero volts and a second positive voltage that is less than a breakdown voltage of the complementary field effect transistor driver.

5. The method of claim 1 further including applying information to be displayed to a current electrode of a select transistor responsive to a scan signal for coupling the information to be displayed to a storage capacitor, the storage capacitor coupled to an input of the complementary field effect transistor driver.

6. The method of claim 1 further including forming the pixel element and complementary field effect transistor driver on a substrate.

7. An electro-luminescent display circuit comprising:

a complementary field effect transistor driver having a first field effect transistor and a second field effect transistor connected in a stacked configuration, an input, and an output;

a pixel element of an electro-luminescent display, the pixel element having a first electrode and a second electrode wherein the first electrode is coupled to the output of the complementary field effect transistor driver;

a first alternating voltage coupled to the second electrode of the pixel element;

a second alternating voltage coupled to a voltage supply terminal of the complementary field effect transistor driver; and wherein the circuit includes a first current electrode of the first field effect transistor coupled to the second alternating voltage, a second current electrode of the first field effect transistor coupled to the output of the complementary field effect transistor driver, a control electrode of the first field effect transistor coupled to the input of the complementary field effect transistor driver, a first current electrode of the second field effect transistor coupled to a ground reference, a second current electrode of the second field effect transistor coupled to the output of the complementary field effect transistor driver, and a control electrode of the second field effect transistor coupled to the input of the complementary field effect transistor driver.

8. The circuit of claim 7 wherein the first alternating voltage has a phase that is substantially opposite to a phase of the second alternating voltage.

9. The circuit of claim 7 wherein the second alternating voltage is less than a breakdown voltage of the complementary field effect transistor driver.

10. The circuit of claim 7 wherein the first alternating voltage is no greater than a threshold voltage of the pixel element and the second alternating voltage is no greater than a difference between the first alternating voltage and a maximum intensity voltage of the pixel element.

* * * * *